| United States Patent [19] | [11] | 4,456,730 |
|---|---|---|
| Ballé et al. | [45] | Jun. 26, 1984 |

[54] POLYMER MODIFIED POLYAMINES AND A PROCESS FOR THEIR PREPARATION

[75] Inventors: Gerhard Ballé, Leverkusen; Werner Rasshofer, Cologne, both of Fed. Rep. of Germany

[73] Assignee: Bayer Aktiengesellschaft, Leverkusen, Fed. Rep. of Germany

[21] Appl. No.: 506,262

[22] Filed: Jun. 21, 1983

[30] Foreign Application Priority Data

Jun. 23, 1982 [DE] Fed. Rep. of Germany ....... 3223396

[51] Int. Cl.$^3$ ............................................. C08G 13/83
[52] U.S. Cl. .................................. 524/839; 525/132; 525/440; 525/455; 528/59
[58] Field of Search ................ 524/839; 525/132, 440, 525/455; 528/59

[56] References Cited

U.S. PATENT DOCUMENTS

| 3,968,089 | 7/1976 | Euscurida et al. | 525/455 |
|---|---|---|---|
| 4,085,165 | 4/1978 | Odaka et al. | 525/455 |
| 4,211,683 | 7/1980 | Wenzel et al. | 525/455 |
| 4,269,748 | 5/1981 | Nachtkamp et al. | 524/591 |
| 4,283,500 | 8/1981 | Armstrong et al. | 525/455 |
| 4,386,218 | 5/1983 | Rasshofer et al. | 528/68 |

*Primary Examiner*—Maurice J. Welsh
*Attorney, Agent, or Firm*—Gene Harsh; Joseph C. Gil; Lyndanne M. Whalen

[57] ABSTRACT

Polymer modified polyamines having a polymer content of from 1 to 30 wt. % and an aromatic amino group content of from 1 to 12.5 wt. % are produced by hydrolyzing a polyisocyanate prepolymer in an aqueous alkaline medium. The polyisocyanate prepolymer is polymer modified by in situ polymerization of either the prepolymer or the isocyanate used in making the prepolymer with an unsaturated monomer in the presence of a radical forming polymerization catalyst in a manner such that a solution and/or dispersion is formed. The prepolymer is formed from a relatively high molecular weight polyhydroxyl compound, aromatic polyisocyanate, and optionally a chain extender or crosslinking agent. The aromatic polyisocyanate used is from 60–100 wt. % polyisocyanate of the diphenyl alkane series and from 0 to 60 wt. % tolylene diisocyanate. The preferred unsaturated monomer is acrylonitrile containing up to 20 wt. % comonomer. The polymer modified polyamines of the present invention are particularly useful in the production of polyurethanes.

14 Claims, No Drawings

POLYMER MODIFIED POLYAMINES AND A PROCESS FOR THEIR PREPARATION

BACKGROUND OF THE INVENTION

This invention relates to a process for the preparation of polyamines which are modified predominantly or exclusively in the polyisocyanate component by the hydrolysis of isocyanate prepolymers.

Several processes for the preparation of polyether polyamines containing aromatically bound amino end groups which polyamines are useful starting components for the polyisocyanate polyaddition processes are known to those in the art. These methods are summarized in the description of the state of the art given in German Offenlegungsschriften Nos. 2,948,419 and 3,039,600. These Offenlegungsschriften are directed to processes for the hydrolysis of isocyanate prepolymers based on polyethers, using alkali metal hydroxides in aqueous media. The polyamine is freed from the carbamate intermediate stage by the addition of acid or of acid ion exchangers.

It is also known that use of polymer modified polyether polyols which correspond to the so called "polymer polyols" results in polyurethanes having improved properties. Polymer modified polyoxyalkylene polyamines obtained by graft polymerization of monomers in polyoxyalkylene polyamines terminated with aliphatic amino groups have been described in U.S. Pat. No. 4,286,074. These aliphatic polyamines are, however, relatively difficult to obtain and are too highly reactive for many purposes.

It has been found that when modified polyether polyamines are prepared either by hydrolyzing an isocyanate prepolymer made with polymer polyols (i.e., relatively high molecular weight polyols) under alkaline conditions or by hydrolyzing isocyanate prepolymers and then modifying the thus-produced (aromatic) polyamines, the products obtained are highly viscous and in many cases can only be worked up using techniques such as intense heating.

A method for obtaining polymer modified polyisocyanates based on diphenyl methane which have a relatively low viscosity has been disclosed in European Patent Application EP No. 0,037,112. These products are polymethylene polyphenyl polyisocyanates and their functional derivatives, e.g. carbodiimide- or urethone imine-modified diphenyl methane diisocyanates and similar compounds.

SUMMARY OF THE INVENTION

It is an object of the present invention to provide a process for the production of polymer modified polyamines having aromatically bound primary amino end groups.

It is also an object of the present invention to provide a process for the production of polymer modified polyether polyamines useful in the production of heat stable polyurethanes and/or polyurethane ureas.

It is a further object of the present invention to provide a process for the production of polymer modified polyamines showing an excellent stability of the dispersion of the polymer moiety in that polymer modified polyamine.

These and other objects which will be apparent to those skilled in the art are accomplished by hydrolyzing in an aqueous alkaline medium an isocyanate prepolymer having aromatically bound isocyanate groups. The isocyanate prepolymer is prepared from a relatively high molecular weight polyhydroxyl compound, excess aromatic polyisocyanate and optionally, low molecular weight chain lengthening or cross linking agent. The isocyanate prepolymers which are hydrolyzed have an NCO content of from 1 to 12.5 wt % and a polymer content of from 1 to 30 wt %. These prepolymers are synthesized from 60 to 100 wt % polyisocyanate(s) of the diphenyl alkane series and, optionally, conversion products of these polyisocyanates, and from 0 to 40 wt % tolylene diisocyanate(s). The prepolymer and/or isocyanate from which the prepolymer is prepared is modified by in situ polymerization with one or more unsaturated monomers in the presence of a radical forming polymerization catalyst before hydrolysis of the prepolymer.

DETAILED DESCRIPTION OF THE INVENTION

The present invention relates to a process for the preparation of polymer modified polyamines having aromatically bound primary amino groups in end position. These modified polyamines are made by hydrolyzing isocyanate prepolymers having aromatically bound isocyanate groups in an aqueous alkaline medium. These prepolymers are made from relatively high molecular weight polyhydroxyl compounds, optionally low molecular weight chain lengthening agents or cross linking agents and excess aromatic polyisocyanates. The isocyanate prepolymers used for hydrolysis are polymer modified isocyanate prepolymers having an NCO content of from 1 to 12.5 wt %, (preferably from 1.2 to 7.5 wt % NCO) and a polymer content of from 1 to 30 wt % (preferably from 3 to 25 wt %) dispersed and/or grafted therein. These prepolymers have been synthesized from 60 to 100 wt % of polyisocyanates of the diphenyl alkane series corresponding to the general formula

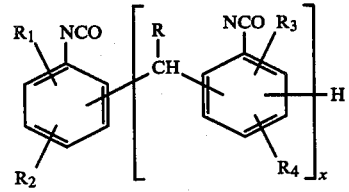

in which
R represents hydrogen or a straight chained or branched alkyl group having 1 to 7 carbon atoms, preferably a

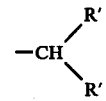

group in which R' represents $CH_3$, $C_2H_5$ and/or n- or iso-propyl, most preferably hydrogen;

$R_1$, $R_2$, $R_3$ and $R_4$ (which may be the same or different) each represents hydrogen or an alkyl group with up to 5 C atoms, preferably H, or alkyl groups such that $R_1$ and $R_2$ are not the same as $R_3$ and $R_4$; and x represents an integer of from 1 to 10, preferably 1 to 4, most preferably 1 and optionally conversion products of these diphenyl alkane polyisocyanates; and from 0 to 40 wt % tolylene diisocyanates. The polyisocyanates (preferably the polyisocyanate(s) of the diphenyl alkane series) and/or isocyanate prepolymers are modified by in situ polymerization with one or more unsaturated monomers (preferably acrylonitrile, styrene and/or other comonomers) in the presence of a radical forming polymerization catalyst resulting in the formation and (preferably) dispersion of the polymer prior to hydrolysis. The present invention also relates to the polymer modified polyamines containing aromatic amino groups and having a polymer content of from 1 to 30 wt % and an aromatic amino group content of from 1 to 12.5 wt % which are prepared by this process.

The polymer modified aromatic polyamines are generally produced by reacting a liquid polyisocyanate or polyisocyanate mixture based on diphenyl alkane diisocyanates and optionally tolylene diisocyanates with relatively high molecular weight polyhydroxyl compounds (preferably a polyether polyol) at an NCO/OH ratio of at least 1.1:1 up to about 10:1 (preferably in the range of from 1.3:1 to 3:1, most preferably from 1.5:1 to 2.2:1) to form an isocyanate functional polyurethane prepolymer. The liquid polyisocyanate starting material either has been previously modified by in situ polymerization of vinyl monomers or the isocyanate functional polyurethane prepolymer prepared therefrom is subsequently modified by in situ polymerization of vinyl monomers. The resulting polymer modified isocyanate prepolymer is then reacted with an alkali metal hydroxide, alkaline earth metal hydroxide or tertiary amine, optionally in the presence of water miscible and preferably polar solvents and in the presence of excess quantities of water. The free isocyanate groups are thus saponified to carbamate groups and/or carbonate groups (depending upon the particular process employed). Decomposition of the carbamate groups to primary amino groups may be carried out by any of the methods known to those in the art. In one method, acid or, more conveniently, a cation exchange resin is added to the carbamate. The cation exchange resin may be filtered off after release of the amino groups from the carbamate groups with release of $CO_2$ and regenerated (DE-A No. 3,039,600). Hydrolysis may also be carried out using aqueous carbonate or alkali metal carboxylate solutions (optionally in the presence of solvents) or in the presence of solvent alone to yield polyamines in a one-step process. Hydrolysis may further be carried out in a one-step process with aqueous tertiary amines at elevated temperature.

The relatively high molecular weight polyhydroxyl compounds used in preparing the prepolymers may be compounds having a molecular weight of from 400 to 12,000, (preferably from 800 to 6,000) containing from at least 2 to 10 (preferably 2 to 4, most preferably 2 or 3) hydroxyl groups and having a melting point below 60° C. Appropriate polyhydroxyl compounds include any of the usual hydroxypolyethers, hydroxycarbonates, hydroxylactones and hydroxypolythioethers of polyurethane chemistry as well as hydroxypolyesters. The known hydroxypolyethers are preferred for purposes of the present invention. Such hydroxypolyethers may be obtained, for example, by polymerization of alkoxides such as ethylene oxide, propylene oxide, butylene oxide, styrene oxide and/or epichlorohydrin itself (themselves) (in the presence of water) or by the chemical addition of epoxide (preferably ethylene oxide and/or propylene oxide) optionally as mixtures or in block form, to starting components containing reactive hydrogen atoms. Such reactive hydrogen-containing materials include water; alcohols, such as ethylene glycol, propylene glycol, trimethylol propane, glycerol, sorbitol, sucrose, and 4,4-dihydroxydiphenyl propane; ammonia; and amines such as aniline, ethanolamine, ethylene diamine and tetrahydroxy ethylene diamine. It is in many cases preferred to use polyethers which contain predominantly primary OH groups. Such polyethers are in most cases prepared by end group modification with ethylene oxide. Particularly suitable polythioethers are the condensation products obtained by the reaction of thiodiglycol itself and/or with other glycols.

The hydroxy polycarbonates used in the practice of the present invention may be of known type, such as those based on hexane-1,6-diol or mixed carbonates of hexane diol with other diols such as propane diol, butane-1,4-diol or diethylene glycol.

The hydroxy caprolactones which may be used include ε-caprolactone derivatives and methyl-ε-caprolactone derivatives which have been started on diols or polyols such as diethylene glycol or trimethylol propane.

The hydroxy polyesters useful in the present invention include those obtained from dicarboxylic acids and diols and/or polyols. Those polyesters in which adipic acid or longer chained diols (containing at least 5 carbon atoms) have been used to provide improved resistance to hydrolysis.

Polybutadienes containing hydroxyl groups are also suitable starting materials in the process of the present invention.

Appropriate polyols may also contain urethane groups which may be incorporated by, for example, pre-lengthening the polyols with sub-equivalent quantities of diisocyanates. The relatively high molecular weight polyhydroxyl compounds may, of course, also be used as mixtures such as mixtures of various polyethers or of polyethers and polyesters.

The low molecular weight chain lengthening or cross linking agents used in the practice of the present invention may also be compounds having at least 2 (preferably 2 to 4) isocyanate reactive hydrogen atoms (preferably hydroxyl groups) and a molecular weight of from 32 to 399 (preferably from 62 to 250). These include the compounds containing hydroxyl and/or amino groups known in polyurethane chemistry as chain lengthening agents or cross linking agents. Specific examples of such compounds include: ethylene glycol; 1,2- and 1,3-propanediol; 1,4- and 2,3-butanediol; neopentyl glycol; 1,4-bis-hydroxymethyl cyclohexane; 2-methyl-1,3-propanediol; hydroquinone-bis-hydroxyethyl ether; glycerol; trimethylol propane, pentaerythritol; quinitol; mannitol; diethylene glycol; dipropylene glycol; dihydroxy-diphenyl propane; ethanolamine; diethanolamine; triethanolamine and 3-aminopropanol.

The polyisocyanates useful in the present invention are predominantly (60 to 100 wt %) polyisocyanates of the diphenyl alkane series corresponding to the general formula:

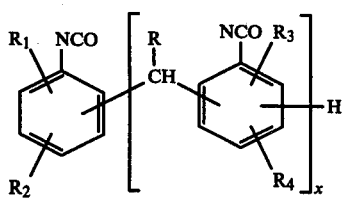

in which

R represents hydrogen, a straight chained or branched alkyl group with 1 to 7 carbon atoms, preferably a

group in which

R' represents $CH_3$, $C_2H_5$ and/or n/iso-$C_3H_7$ (hydrogen is most preferred);

$R_1$, $R_2$, $R_3$ and $R_4$ (which may be the same or different) each represent a $C_1$–$C_5$ alkyl group or H (e.g., $CH_3$, $C_2H_5$, n- or iso-propyl, or n-, iso- or tertiary butyl), preferably H or different alkyl groups so that $R_1$ and/or $R_2$ are not the same as $R_3$ and/or $R_4$; and x represents an integer of from 1 to 10, preferably 1 to 4, and most preferably 1.

Products obtained by modification of these polyisocyanates by di- or trimerization, carbodiimidization, urethone imine modification, reaction with sub-equivalent quantities of polyols and similar known modifications may optionally be included.

From 0 to 40 wt % tolylene diisocyanates may be used for the preparation of the prepolymers useful in the present invention. The tolylene diisocyanates which may be used include the usual isomers or isomeric mixtures, preferably 2,4- and/or 2,6-tolylene diisocyanates.

The diphenyl alkane polyisocyanates are either polymer modified by in situ polymerization of vinyl monomers prior to hydrolysis (a preferred embodiment) or the isocyanate prepolymers are first prepared using diphenyl alkane polyisocyanates and these prepolymers are subsequently polymer modified in situ.

Examples of suitable diphenyl alkane polyisocyanates are diphenyl methane-4,4'- and/or 2,4'- and/or 2,2'-diisocyanates. Commercial mixtures obtained by the phosgenation of reaction products of aliphatic aldehydes (preferably formaldehyde) with aniline or alkyl substituted anilines may also be used. These mixtures contain dinuclear and trinuclear and optionally tetranuclear polyisocyanates or they may be even more highly condensed polyisocyanate mixtures (in the case of undistilled phosgenation products of amine condensation products) which are used and known commercially under the name of "crude MDI".

Di, tri- and tetra-alkyl substituted diphenyl alkane derivatives are also suitable. Specific examples of appropriate diphenyl isocyanates are: 3-methyl-4,4'-diphenyl methane diisocyanate; 3-isobutyl-4,4'-diphenyl methane diisocyanate; 3,3'-dimethyl-4,4'-diphenyl methane diisocyanate; 3,5-dimethyl-3'-isopropyl-diphenyl methane diisocyanate, 3,5-dimethyl-3',5'-diisopropyl-diphenyl methane diisocyanate and 3,5,3',5'-tetramethyl-diphenyl methane-4,4'-diisocyanate. Diisocyanates obtained by the condensation of higher aldehydes (such as acetaldehyde, propionaldehyde, butyraldehyde, isobutyraldehyde or octanal) with aniline and/or mono- and/or di-$C_1$–$C_4$-alkylanilines followed by phosgenation are also suitable. Examples of such diisocyanates are α,α-diphenyl ethane-4,4'-diisocyanate, α,α'-diphenylpropane-4,4'-diisocyanate and α,α-diphenyl β-methyl-diphenyl propane-4,4'-diisocyanate.

These polyisocyanates are preferably used in liquid form. A liquid form may be obtained either by mixing the polyisocyanates or by modifying the polyisocyanates (for example by di- and/or trimerization, by carbodiimidization or preferably by reaction) with subequivalent quantities of diols and/or polyols.

Polymer modification of the diphenyl alkane polyisocyanates may be carried out by processes which are known to those in the art. Appropriate processes are described for diphenyl methane derivatives in European Patent Application No. 37,112. The diphenyl alkane polyisocyanates, optionally in admixture with up to 40 wt % tolylene diisocyanates, may be polymer modified at temperatures from room temperature to about 130° C. (preferably from 50° to 120° C.) in the presence of a catalyst capable of catalyzing the radical polymerization of vinyl monomers in the presence of vinyl monomers. Peroxides, persulphates, perborates, percarbonates and azo compounds and other radical forming catalysts are appropriate. Specific examples of catalysts are 2,2'-azo-bis-isobutyronitrile; dibenzoyl peroxide; lauroyl peroxide; di-tertiary butyl peroxide; diisopropyl peroxidicarbonate; tertiary butyl peroxide-2-ethyl hexanoate; tertiary butyl perpivalate; tertiary butyl perbenzoate and other conventional catalysts.

Acrylonitrile is a vinyl monomer which is particularly suitable for the polymer modification reaction. Acrylonitrile may also be used in combination with other monomers (comonomers) such as styrene. Comonomers which may advantageously be used in proportions of up to 60 wt % (based on the sum of monomers), more preferably up to 20 wt %, include: styrene; α-methyl styrene, acrylic or methacrylic acid; acrylic or methacrylic acid esters; acrylamide or methacrylamide; hydroxyalkyl esters of acrylic or methacrylic acid having 2 to 6 carbon atoms in the alkyl residue, such as 2-hydroxy ethyl- or 2-hydroxy propyl-(meth)acrylate; vinylidene chloride and/or branching monomers having two unsaturated groups such as divinyl benzene. The (further) comonomers used in quantities of up to 20 wt % in addition to acrylonitrile and styrene (as main components) are preferably compounds such as methylstyrene, (meth)acrylamide, (meth)acrylic acid, (meth)acrylic esters and/or divinyl benzene. Preferred are proportions of acrylonitrile to styrene of 60:40 by weight to 40:60% by weight.

The total quantity of monomer used for modification of the polyisocyanate depends upon the proportion of polymer desired in the end product (i.e. the polymer modified polyether polyamine). It is preferable to use a quantity of monomer such that the polymer content in the end product is from 1 to 30 wt %, most preferably from 3 to 25 wt %.

It has been found that when diphenyl alkane polyisocyanates are polymer-modified, solutions of the polymers or exceptionally finely divided stable dispersions of the polymers in the polyisocyanates are obtained. After saponification of such modified polyisocyanates to polyamines, finely divided, dispersed and stable polymer polyamines which have a high storage stability are obtained. This particularly advantageous dispersion may be attributable to the fact that graft products which contribute to the stability and fine subdivision are readily obtained by the grafting reactions of the monomers on the CH group of the diphenyl alkane group. When tolylene diisocyanate alone is used, coarse dispersions are obtained. Such coarse dispersions are unsuitable and rapidly settle. The addition of limited quantities of tolylene diisocyanate, however, does not adversely affect the stability. In fact, in most cases use of limited quantities of tolylene diisocyanate improves the stability of the dispersion.

One method for polymer modification of polyphenyl ethylene polyisocyanates (especially diphenyl methane diisocyanates and its modification products) is described in detail in U.S. Pat. No. 4,283,500. Other methods for polymer modification of polyisocyanates may be found in British Pat. Nos. 1,447,273 and 1,447,274, Japanese Patent Publication JA No. 50 149 795 and U.S. Pat. No. 3,422,165.

The relatively high molecular weight polyol(s), the optional low molecular weight chain lengthening agent(s), polymer modified diphenyl alkane polyisocyanate(s) and optional tolylene diisocyanate are reacted together at an NCO/OH ratio such that the polymer modified isocyanate prepolymer will have an isocyanate content of from 1 to 12.5 wt %, preferably from 1.2 to 7.5 wt %, as well as a polymer content of from 1 to 30 wt %, preferably from 3 to 25 wt %. The NCO/OH ratio should generally be at least 1.1:1 and may be up to about 10:1, preferably in the range of from 1.2:1 to 3:1 and most preferably from 1.3 to 2.5. The prepolymer-forming reaction may be carried out solvent-free in the usual manner at temperatures of up to about 130° C. or in an inert solvent such as dioxane. If a solvent is used, it may also serve as a solubilizing agent at the stage of hydrolysis or it may be distilled off.

Polymer modified isocyanate prepolymers may also be prepared by first preparing an isocyanate prepolymer from the relatively high molecular weight polyol, the optional low molecular weight chain lengthening agent and the diphenyl alkane polyisocyanate and optional tolylene diisocyanate, and then reacting this isocyanate prepolymer with vinyl monomer in the presence of radical forming catalysts to form the polymer modified isocyanate prepolymer. The grafting reaction with vinyl monomers preferably takes place on the diphenyl alkane-CH group and results in highly storage stable solutions and/or finely divided polymer dispersions within the isocyanate prepolymers.

When polymer modification is carried out on isocyanate prepolymers, somewhat higher proportions of the polymers may be present in the form of solution (in addition to the dispersed form). The polyisocyanate polymer dispersions may also contain varying proportions of dissolved polymers since the polyisocyanates act as relatively good solvents for many of the polymers used.

Polymer modification of isocyanate prepolymers is known to those skilled in the art and has been described in U.S. Pat. Nos. 3,968,089 and 4,283,500 and in German Offenlegungsschrift No. 2,609,355.

The most commercially important polymer modified isocyanate prepolymers for the preparation of polymer modified polyamines are those based on diphenyl methane diisocyanates, their commercial isomers or multinuclear mixtures, their modification products with carbodiimide groups or urethone imine groups and the products obtained by reaction with subequivalent quantities of polyols.

For hydrolysis, it is particularly preferred to use dispersions of polymer modified isocyanate prepolymers in which the polymer component is at least 40 wt % acrylonitrile and up to 60 wt % comonomer.

Conversion of the polymer modified isocyanate prepolymers into the polymer modified polyamines in accordance with the present invention is carried out by hydrolysis in aqueous alkaline media by various methods known to those in the art. German Offenlegungsschrift No. 2,948,419, for example, describes one such alkaline hydrolysis. In this disclosed process, excess quantities of alkali metal hydroxides are used to hydrolyze a polyamine at relatively low temperatures. The resulting carbamate or carbonate is then treated with excess mineral acid to liberate $CO_2$. The polyamine is subsequently separated from the acid salts by means of equivalent quantities of bases. The polyamine is isolated by phase separation, extraction or other conventional methods of working up. A simplified method of working up the carbamate or carbonate intermediate stages formed by the addition of alkali is given in German Offenlegungsschrift No. 3,039,600. In this simplified method, acid ion exchange resins are used instead of mineral acids. The $OH^\ominus/NCO$ ratio may be in the range of 0.3:1 to 2:1 but it is preferred to employ an equivalent ratio of about 1:1, which in practice may be varied from 0.9 to 1.3.

Hydrolysis may also be carried out with hydroxides of metals of the Second and Third Main Groups of the Periodic Table of Elements, optionally in the presence of solvents such as dioxane or tetrahydrofuran, by mixing alkaline solutions and isocyanate prepolymers or prepolymer solutions. Mixing is advantageously carried out continuously. In one simplified process, the compounds containing carbamate and/or carbonate groups obtained after hydrolysis of the isocyanate compounds with alkaline solutions are treated at temperatures of up to 200° C. (preferably up to about 130°C.) to recover the polyamine from the reaction mixture. The polyamine obtained after liberation of the $CO_2$ is then separated or extracted. The alkali metal carbonates or bicarbonates left behind may be separated by filtration or by washing.

Tertiary amines may be used as catalysts for the hydrolysis of the isocyanate groups instead of alkali metal hydroxides. The tertiary amines used should preferably be aliphatic or cycloaliphatic amines. The hydrolysis process is particularly simple when using water soluble tertiary amines (e.g. tetramethyl ethylene diamine; permethylated diethylene triamine; N-methyl morpholine; bis-2-dimethylamino ethyl-ether and N-methyl piperidine) because these amines together with the necessary quantities of water act as both catalyst and solvent for the reaction mixture. The reaction may be carried out at temperatures of up to about 150° C., preferably 65° C. to 130° C., and most preferably the boiling point of the mixture (which due to the presence of excess water is generally close to 100° C.). $CO_2$ is almost spontaneously split off even at relatively low temperatures. Vigorous and rapid mixing of the reactants is essential, and may be ensured by the addition of water-soluble solvents (e.g., dioxane or tetrahydrofuran) and/or the use of a sufficiently large excess of tertiary amines. The reaction may be carried out intermittently or continuously.

If the tertiary amine used (e.g., triethylamine, triamylamine and dimethyl cyclohexylamine) is not soluble or not completely soluble in water, the mixture of water and isocyanate prepolymer(s) is homogenized by means of a water-soluble solvent such as dioxane or tetrahydrofuran or, most preferably, water miscible co-solvents containing carboxylic acid dialkylamide, lactam, tetraalkyl urea, sulfone, sulfoxide, phosphorus dialkylamide, nitrile or ketone groups. Dimethyl formamide, N-methyl pyrrolidone, dimethyl acetamide and tetramethylene sulfone are particularly preferred examples of such co-solvents. Where such insoluble tertiary amines are used, the hydrolysis reaction is generally carried out at temperatures of up to 150° C., preferably 65° to 130° C. and most preferably the boiling point of the mixture. Almost immediately after the reaction (recognized by spontaneous and rapid evolution of $CO_2$), the reaction mixture can be worked up into the polyamine simply by distilling off excess tertiary amine and solvent. This method has the advantage that virtually no salts are formed in the hydrolysis or working up and neutralization of alkali metal salts.

The products obtained by the process of the present invention differ in structure from known products prepared either from polymer modified polyether polyols or from polyamines which were polymer modified after formation of the polyether amines because polymer modification is carried out on the starting polyisocyanates or the isocyanate prepolymers. The polymer modified polyether polyamines of the present invention form exceptionally finely divided dispersions which are resistant to sedimentation and have viscosities below 10,000 mPas at 75° C. Depending upon the chain length and functionality of the relatively high molecular weight polyol used as starting material, the polyamines may be useful in the preparation of flexible polyurethane foams (either block foamed or formed in the mold), microcellular or solid elastomers as well as semi-rigid and rigid integral foams. The polymer modified polyamines are relatively high molecular weight compounds containing isocyanate reactive hydrogen atoms. They may, if desired, be combined with low molecular weight (molecular weight 32 to 399) and/or relatively high molecular weight (molecular weight 400 to about 12,000) compounds containing isocyanate reactive groups.

Suitable starting components for the preparation of polyurethanes are known and have been described above (in connection with the preparation of isocyanate prepolymers) and in German Published Applications Nos. 2,302,564; 2,432,764 (U.S. Pat. No. 3,903,679); 2,639,083; 2,512,385; 2,513,815; 2,550,796; 2,550,797; 2,550,833; 2,550,860 and 2,550,862. Appropriate auxiliary agents and additives which may be used in the preparation of polyurethanes are also described in the literature.

Polyurethanes (urea) may be produced from the polyamines prepared in accordance with the present invention. These polyurethanes may be used for elastomers, coatings or threads (applied solvent-free or from solutions or dispersions) or as reactive component mixtures.

The polyamines of the present invention may also be used as coupling components for diazo dyes, hardeners for epoxide and phenol resins and any other known reactions of amines (such as the formation of amides or imides).

Having thus described our invention, the following examples are given by way of illustration. The percentages given in these examples are percentages by weight, unless otherwise indicated.

EXAMPLES

EXAMPLE 1

This example illustrates preparation of a polymer modified diphenyl methane diisocyanate.

A polymer modified polyisocyanate was obtained by the following method (according to European Patent Application No. 37,112). 200 parts of a mixture of equal parts of a carbodiimidized diphenyl methane diisocyanate and a polymethylene-polyphenyl isocyanate mixture having a dinuclear isocyanate content (diphenyl methane diisocyanates) of 60 wt % were introduced into a stirrer vessel equipped with reflux condenser, stirrer, dropping funnel and gas inlet tube. The mixture had an isocyanate group content of 30% and a viscosity of 85 mPas/25° C. 6 parts of acrylic acid were added and the mixture was heated to 100° C. in a nitrogen atmosphere. After 30 minutes, 294 parts of acrylonitrile containing 4.5 parts (1.5 wt %, based on the monomers) of azoisobutyronitrile in solution were added to the stirrer vessel. The introduction of acrylonitrile was completed after one hour. Stirring was then continued for about one hour and unreacted acrylonitrile was distilled off under vacuum. The isocyanate group content was found to be 21.16% NCO with a polymer content of 28.8 wt %. The product was a finely divided dispersion, slightly brownish in color, with a viscosity of 660 mPas/20° C.

EXAMPLE 2

A polymer modified isocyanate prepolymer was prepared by adding 893 g (4.5 equivalents of NCO) of the polymer modified polyisocyanate from Example 1 to 2,000 g (2 equivalents) of a polypropylene glycol having a molecular weight of 2,000. The mixture was heated until a calculated isocyanate content of 3.6 wt % was obtained.

The solution of this isocyanate prepolymer in 1,600 ml of dioxane was added drop-wise to a solution of 161 g of potassium hydroxide (2.87 mol) $OH^{\ominus}$ NCO = 1.15:1) in 600 ml of water. The reaction temperature was maintained at 23° C. The reaction mixture was stirred for 15 minutes at this temperature, and 2,500 ml of an acid cation exchange resin (Levatit SPC 118 ®/Bayer AG Leverkusen) were added. Vigorous evolution of $CO_2$ set in as the reaction mixture was heated to 60° C. 53.8 liters of $CO_2$ were liberated. After removal of the cation exchanger by filtration, a finely divided, storage stable dispersion was obtained. This dispersion was characterized by the following:
NH number: 51.2 mg KOH/g (calculated 48.1)
Acid number: 0.9
Viscosity:
37,500 mPas/20° C.
2,300 mPas/75° C.

EXAMPLE 3

4,800 g (3 equivalents) of a polyether polyol (which had been obtained by the addition of propylene oxide followed by ethylene oxide to trimethylol propane and had an OH number of 35 and a primary OH group content amounting to more than 70% of the total OH group content) were reacted with 1,474 g (6.6 isocyanate equivalents) of the polymer modified polyisocyanate described in Example 1 to form a prepolymer having an isocyanate content of 2.5%.

The product was saponified with aqueous KOH (1.15 equivalents OH⊖/NCO equivalents) under the conditions described in Example 2, and the polyamine was released by means of a cation exchange resin. A stable, finely divided dispersion with a polymer content of 6.2 wt % (calculated from the proportions of the reactants) was obtained. The dispersion was characterized by the following:

NH number: 26.0 (calculated: 27.9)
Acid number: 1.2
Viscosity:
 29,700 mPas/20° C.
 2,500 mPas/75° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polymer modified polyamine having aromatically bound primary end groups by hydrolyzing in an aqueous alkaline medium a polymer modified isocyanate prepolymer having an isocyanate content of from 1 to 12.5 wt % and a polymer content of from 1 to 30 wt % which prepolymer is made from
    (a) a relatively high molecular weight polyhydroxyl compound,
    (b) aromatic polyisocyanate, and optionally,
    (c) chain lengthening or cross-linking agent and is polymer modified by in situ polymerization of the prepolymer or the isocyanate used to make the prepolymer with at least one unsaturated monomer in the presence of a radical forming polymerization catalyst to form a solution and/or dispersion provided that the aromatic polyisocyanate (b) is
    (i) 60 to 100 wt % polyisocyanate of the diphenyl alkane series corresponding to the formula

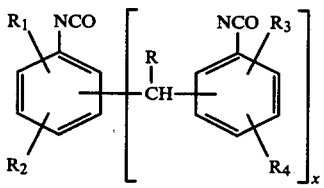

in which
R represents hydrogen, a straight-chained alkyl group having 1 to 7 carbon atoms or a branched alkyl group having 1 to 7 carbon atoms;
$R_1$, $R_2$, $R_3$, $R_4$ (which may be the same or different) each represents hydrogen or an alkyl group having up to 5 carbon atoms; and
x represents an integer of from 1 to 10; and
    (ii) 0-40 wt % tolylene diisocyanate.

2. The process of claim 1 in which polyisocyanate (b) (i) also includes conversion products of the diphenyl alkane polyisocyanates.

3. The process of claim 1 in which the polyisocyanate (b) (i) is a diphenyl alkane polyisocyanate in which R represents hydrogen or a

group in which R' represents $CH_3$, $C_2H_5$ and/or n- or isopropyl; $R_1$, $R_2$, $R_3$ and $R_4$ represent alkyl groups or hydrogen such that $R_1$ and $R_2$ are not the same as $R_3$ and $R_4$; and x represents an integer of from 1 to 4, and optionally conversion products of the diphenyl alkane polyisocyanate.

4. The process of claim 1 in which the polyisocyanate (b) (i) corresponds to the formula in which R, $R_1$, $R_2$, $R_3$ and $R_4$ represent hydrogen and x represents an integer from 1 to 4.

5. The process of claim 1 in which the polyisocyanate of the diphenyl alkane series (b) (i) is modified by in situ polymerization with one or more unsaturated monomers in the presence of radical forming polymerization catalyst before the prepolymer is prepared.

6. The process of claim 5 in which tolylene diisocyanate (b) (ii) is present in the polyisocyanate of the diphenyl alkane series (b) (i) before (b) (i) is polymer modified.

7. The process of claim 1 in which the isocyanate prepolymer is first prepared from unmodified polyisocyanate (b) (i) and optionally (b) (ii) and then modified by in situ polymerization with one or more unsaturated monomers in the presence of radical forming polymerization catalyst to form a solution and/or dispersion of the polymer.

8. The process of claim 1 in which the unsaturated monomer is acrylonitrile with up to 60 wt % (based on total monomer content) of a compound selected from the group of styrene, α-methyl styrene, (meth)acrylic acid, (meth)acrylic acid esters, (meth)acrylamide, hydroxy alkyl esters of acrylic and methacrylic acid, vinylidene chloride, divinyl benzene and mixtures thereof present as comonomer.

9. The process of claim 8 in which a polymer modified isocyanate prepolymer in the form of a dispersion of the polymer is hydrolyzed to form polymer modified polyamine.

10. A polymer modified polyamine having a polymer content of from 1 to 30 wt % and an aromatic amino group content of from 1 to 12.5 wt % produced by hydrolyzing in an aqueous alkaline medium a polymer modified isocyanate prepolymer having an isocyanate content of from 1 to 12.5 wt % and a polymer content of from 1 to 30 wt % which prepolymer is made from
    (a) a relatively high molecular weight polyhydroxyl compound,
    (b) aromatic polyisocyanates, and optionally,
    (c) chain lengthening or crosslinking agents
and is polymer modified by in situ polymerization of the prepolymer or polyisocyanate used to make the prepolymer with at least one unsaturated monomer in the presence of a radical forming polymerization catalyst to form a solution and/or dispersion provided that the aromatic polyisocyanate (b) is
    (i) 60 to 100 wt % polyisocyanate of the diphenyl alkane series corresponding to the formula

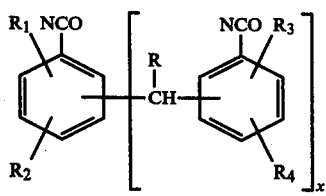

in which

R represents hydrogen, a straight-chained alkyl group having 1 to 7 carbon atoms or a branched alkyl group having 1 to 7 carbon atoms;

$R_1$, $R_2$, $R_3$, $R_4$ (which may be the same or different) each represents hydrogen or an alkyl group having up to 5 carbon atoms; and x represents an integer of from 1 to 10; and (ii) 0–40 wt % tolylene diisocyanate.

11. The polyamine of claim 10 in which R represents hydrogen or a

group in which R' represents $CH_3$, $C_2H_5$ and/or n- or iso-propyl; $R_1$, $R_2$, $R_3$ and $R_4$ represent hydrogen or alkyl groups but $R_1$ and $R_2$ are not the same as $R_3$ and $R_4$; and x represents an integer of from 1 to 4.

12. The polyamine of claim 10 in which R, $R_1$, $R_2$, $R_3$, and $R_4$ each represent hydrogen and x represents an integer of from 1 to 4.

13. The polyamine of claim 10 in which the unsaturated monomer is acrylonitrile in which up to 60 wt % of a compound selected from the group consisting of styrene, α-methyl styrene, (meth)acrylic acid, (meth)acrylic acid esters, (meth)acrylamide, hydroxy alkyl esters of acrylic and methacrylic acid, vinylidene chloride, divinyl benzene and mixtures thereof.

14. The polyamine of claim 10, in which the monomers are 40–60% by weight acrylonitrile and 40–60% by weight styrene.

* * * * *